United States Patent
Brice et al.

(10) Patent No.: US 7,758,776 B2
(45) Date of Patent: Jul. 20, 2010

(54) RAPID MANUFACTURING OF CARBON NANOTUBE COMPOSITE STRUCTURES

(75) Inventors: Craig A. Brice, Fort Worth, TX (US); Frederick J. Herman, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 647 days.

(21) Appl. No.: 11/206,958

(22) Filed: Aug. 18, 2005

(65) Prior Publication Data
US 2007/0290409 A1 Dec. 20, 2007

Related U.S. Application Data

(62) Division of application No. 10/000,917, filed on Oct. 24, 2001, now Pat. No. 6,949,216.

(60) Provisional application No. 60/245,916, filed on Nov. 3, 2000.

(51) Int. Cl.
C04B 35/80 (2006.01)
C04B 35/52 (2006.01)
C23C 14/04 (2006.01)

(52) U.S. Cl. ............ 252/502; 252/500; 428/367; 428/293.1; 428/293.4; 428/614; 423/445 B; 423/447.3; 264/434; 264/401; 264/220; 427/446; 427/449

(58) Field of Classification Search ............ 252/500, 252/502, 511; 428/364, 367, 408; 524/495, 524/496; 423/445 B, 447.3; 75/229; 501/95.1–95.3, 501/99; 264/289.3, 691
See application file for complete search history.

(56) References Cited

U.S. PATENT DOCUMENTS

| 4,663,230 | A |   | 5/1987  | Tennent                  |
|-----------|---|---|---------|--------------------------|
| 4,808,481 | A | * | 2/1989  | Luxon .............. 428/407 |
| 5,147,587 | A |   | 9/1992  | Marcus et al.            |
| 5,611,964 | A | * | 3/1997  | Friend et al. ........ 252/511 |
| 5,643,502 | A | * | 7/1997  | Nahass et al. ........ 252/511 |
| 6,080,343 | A |   | 6/2000  | Kaufman et al.           |
| 6,122,884 | A |   | 9/2000  | Talwar                   |
| 6,144,008 | A |   | 11/2000 | Rabinovich               |
| 6,205,016 | B1| * | 3/2001  | Niu ................ 361/503 |
| 6,214,279 | B1|   | 4/2001  | Yang et al.              |
| 6,420,293 | B1| * | 7/2002  | Chang et al. ....... 501/95.2 |
| 6,495,116 | B1| * | 12/2002 | Herman ............. 423/447.3 |
| 6,630,093 | B1|   | 10/2003 | Jones                    |
| 6,660,343 | B2| * | 12/2003 | McGill et al. ....... 427/597 |
| 7,323,136 | B1| * | 1/2008  | Barrera et al. .......... 419/5 |

\* cited by examiner

FOREIGN PATENT DOCUMENTS
WO    WO 01/57234    \*    2/2001

*Primary Examiner*—Stanley Silverman
*Assistant Examiner*—Kallambella Vijayakumar
(74) *Attorney, Agent, or Firm*—Bracewell & Giuliani LLP (57) ABSTRACT

A system for fabricating a free form structure of a composite material including carbon nanotubes. The system includes a discharge assembly and a composite formation device operatively linked with the discharge assembly. The discharge assembly dispenses a fusing agent such as for example a high energy density emission, a laser emission or a particle beam emission. The composite formation device includes a composite generator and an arranger in operative engagement with a composite generator. The composite generator engages with the fusing agent so as to create a composite nodal element. The composite nodal element includes a matrix and a multiplicity of fibers formed of carbon nanotubes dispersed throughout the matrix. The arranger positions one node relative to another to define the free form structure.

18 Claims, 8 Drawing Sheets

RAPID MANUFACTURING OF CARBON NANOTUBE COMPOSITE STRUCTURES

This application is a divisional of U.S. application Ser. No. 10/000,917, now U.S. Pat. No. 6,949,216, filed Oct. 24, 2001 entitled, "RAPID MANUFACTURING OF CARBON NANOTUBE COMPOSITE STRUCTURES," which claims priority of U.S. Provisional Application No. 60/245,916, filed Nov. 3, 2000, entitled "CARBON NANOTUBE AND METAL/CERAMIC/POLYMER MATRIX COMPOSITES PRODUCED THROUGH DIRECT MANUFACTURING AND NETSHAPED MANUFACTURING METHODS," which are incorporated herein by reference in their entirety.

BACKGROUND OF THE INVENTION

I. Field of the Invention

The present invention generally relates to the creation of free-form composite structures with rapid manufacturing techniques. More particularly, the invention relates to a system and method for fabricating a free-form structure by arranging one composite nodal element relative to another. More particularly, it further relates to generating a composite nodal element containing a matrix and a multiplicity of discreet fibers formed of carbon nanotubes dispersed throughout the matrix.

II. Detailed Description of the Prior Art

Three common allotropes of carbon are diamonds, graphite and fullerenes, such as the Buckyball. For example, carbon nanotubes are a type of fullerene that exhibit mechanical strength and strain characteristics greater than steel and other alloys but exhibit low density characteristics similar to or below that of current ceramic or polymer composites.

Because of their low density, carbon nanotube composites are often difficult to produce when combined with a denser metal, ceramic or polymer matrix. Frequently, during the formation of such composites, gravity pulls and, ultimately, separates denser composite materials from that of the lightweight carbon nanotube composite material. Moreover, due to their electrostatic characteristics, carbon nanotubes tend to conglomerate with one another during the composite formation process rather than homogeneously disbursing with matrix composite materials.

The tendency for the non-homogeneous formation of carbon nanotubes within a composite matrix often results in the application of a non-optimal composite for use by a host system. Accordingly, subjecting such non-optimized composite components to various physical factors over time can result in fractures, fatigue, wear, and possibly, catastrophic failure of that component. Furthermore, the application of post-processing procedures to non-optimized carbon nanotube composites also increases the possibility of a catastrophic failure. For example, machining and other finishing processes impose unnecessary forces and conditions on such composites that can possibly damage the overall matrix arrangement.

TECHNICAL LIMITATIONS OF THE PRESENT INVENTION

Although composites that include carbon nanotubes homogenously dispersed throughout a metal/ceramic/polymer matrix possess certain technical advantages, including favorable physical properties among others, methods for producing these composites have serious limitations. As such, it is very difficult, costly, and time consuming to create a composite where carbon nanotubes are homogeneously dispersed throughout a matrix. For example, manufacturing processes often include a two-step routine of initially forming a composite material and then processing the material so as to define a structure for use with a host system.

Many conventional composite formation techniques fail to meet the requirements for producing carbon nanotubes homogeneously dispersed throughout a metal/ceramic/polymer matrix. Present manufacturing techniques typically form these composites by applying heat and pressure. Unfortunately, the improper application of either heat or pressure often diminishes the net yield of carbon nanotubes formed within the matrix. As such, current composite manufacturing techniques suffer from the limitation of decreasing the yield of carbon nanotubes formed within a matrix due to the improper application of either heat or pressure.

Moreover, in addition to the non-homogeneous dispersment of carbon nanotubes, typical composite formation processes do not randomly align carbon nanotubes throughout a matrix apart from their crystalline and electrical characteristic tendency to conglomerate with one another. This lack of random alignment fails to mitigate or eliminate the propagation of crack formations within a matrix due to the repetitive application of physical forces over time.

In addition to composite manufacturing techniques, current finishing processes for ultimately forming a component part further subject composite material to heat and pressure that can further diminish the effective amount of carbon nanotubes within a matrix. Accordingly, there currently does not exist an apparatus and method for forming a resulting composite component part having an optimal and homogeneous yield of carbon nanotubes within a matrix and without the added step of processing the composite material to form a component part.

SUMMARY OF THE INVENTION

In accordance with the present invention, a free-form structure is generated so that carbon nanotubes are controllably dispersed throughout a matrix composite with little or no need for post-processing procedures so as to optimize the yield of carbon nanotubes within the matrix. Accordingly, via a system implementing rapid manufacturing techniques, carbon nanotubes are randomly as well as homogeneously dispersed as a single stream of powdered-gas mixture for combination with a fusing agent. The resulting composite enjoys an optimal yield of carbon nanotubes homogeneously and randomly dispersed with the matrix. In one exemplary embodiment, the carbon nanotubes are a fiber of a predetermined length designed to blunt a crack formation and, thus, failure of a composite material when subjected to fatigue. In effect, randomly aligned, discrete carbon nanotube fibers inhibit the propagation of crack formation in a broad range of directions so as to improve the loading ability of a resulting composite in a variety of directions.

According to one embodiment of the present invention, a system for fabricating a free-form structure includes a discharge assembly and a composite formation device operatively linked with the discharge assembly. The discharge assembly dispensing a fusing agent such as a high-energy density emission, a laser emission or particle beam emission for example. The composite formation device includes a composite generator and an arranger in operative engagement with the composite generator. Ultimately, the composite generator engages with the fusing agent so as to create a composite nodal element.

The composite nodal element includes a matrix and a multiplicity of fibers formed of carbon nanotubes dispersed throughout the matrix. One exemplary embodiment, for a composite nodal element, a multiplicity of discrete fibers formed of carbon nanotubes range in length from about 10 nanometers to about 500 microns. The arranger positions one node relative to another to define the free-form structure.

A technical advantage of the present invention provides for the nodes containing carbon nanotubes that are arranged with respect to each other, illustratively in a similar manner to that of building blocks, to define a free-form structure without the need of a mold or machining or other post-processing operations. The system, based on a template, controls the size, dimensioning, tolerancing, and material make-up of the resulting free-form structure as it deposits and arranges the multiplicity of composite nodal elements. In one exemplary embodiment, the fibers formed of carbon nanotubes comprise reinforcement fibers for strengthening the matrix and overall free-form structure illustratively in a similar manner to that of reinforced concrete. It should be also added that in one exemplary embodiment, the matrix includes a metal. Moreover, in one exemplary embodiment, the matrix includes a metal alloy. In another exemplary embodiment, the matrix includes an intermetallic compound. In another exemplary embodiment, the matrix includes a ceramic. In another exemplary embodiment, the matrix includes a polymer. Those of ordinary skill in the art will readily recognize any combination of matrix materials for combination with the carbon nanotube fibers.

Another technical advantage includes a program executed through a computer-readable code for fabricating a free-form structure with a fabrication system. The program includes a composite formation program code and a structure formation program code. The composite formation program code generates a composite node via a composite generator by combining a matrix and a multiplicity of fibers formed of carbon nanotubes with a fusing agent. The structure formation program code arranges one composite node relative to another via the arranger to define a free-form structure.

In one exemplary embodiment, the arranger includes a positioning assembly. The positioning assembly moves each one of the nodes according to instructions based on a computer-readable code. The positioning assembly in one exemplary embodiment stores a template associated with the free-form structure.

Accordingly, one technical advantage of the present invention includes the positioning assembly arranging each one of the nodes according to the template.

Moreover, one technical advantage of the present invention provides a system and method for homogeneous formation of carbon nanotubes within a matrix composite.

One technical advantage of the present invention includes a control system for forming the carbon nanotube composite and for arranging the composite into a desired free-form structure.

One technical advantage includes the control system mapping out to scale a resulting component part based on a pre-existing CAD file for that part.

One technical advantage of the present invention includes a fusing agent, such as a laser, for combining carbon nanotubes with other powdered materials so as to form a node or "bead" defined by the desired homogeneous composite material.

One technical advantage of the present invention includes a system for constructing a free-form structure node-by-node so that the resulting structure is to scale with minimal or no need for post-production processing, such as machining or the use of a pre-form/mold.

Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description which is to be taken in conjunction with the accompanying drawings and which like reference numerals indicate like features and wherein.

DETAILED DESCRIPTION OF THE PREFERRED EMBODIMENT

Figure 1:
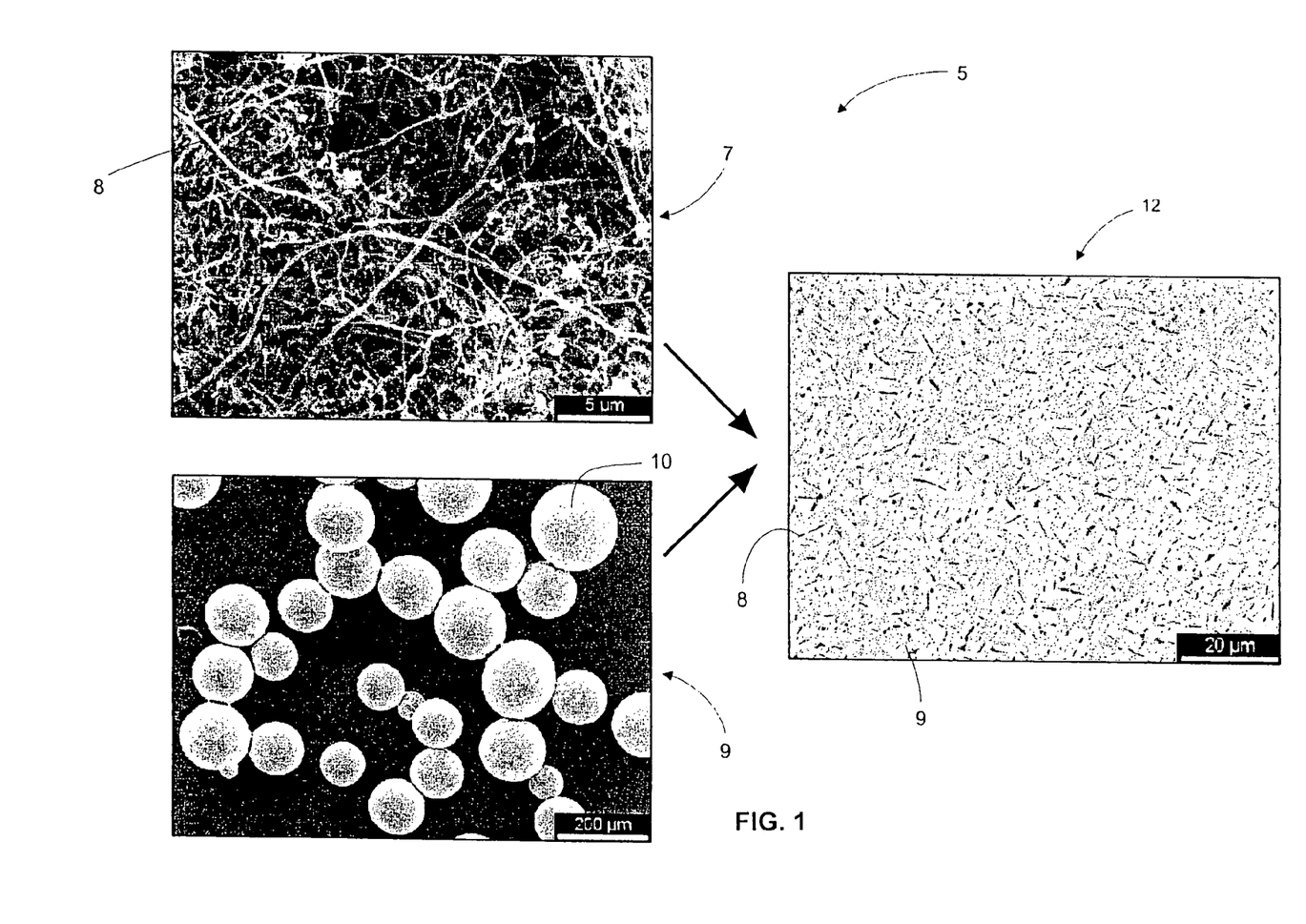
FIG. 1 is a schematic diagram illustrating material formation of a composite nodal element by combining a matrix and a multiplicity of discrete fibers formed of carbon nanotubes.

Preferred embodiments of the present invention are illustrated in the Figures, like numerals being used to refer to like and corresponding parts of the various drawings. FIG. 1 illustrates one aspect, among others, of a process 5 for combining carbon nanotubes 7 with a matrix 9 to produce a composite 12. In another aspect of the present invention shown in FIG. 5, by discretely forming the composite 12 into composite nodal elements 89, a free-form structure 99 is created, via the process 5, by arranging one composite nodal element 89 with respect to another. In effect, composite nodal elements act as "building blocks" that define a free-form structure.

In one exemplary embodiment, as shown in FIG. 1, carbon nanotube fibers 8 are dispersed between a matrix material 10 provided by the matrix 9 to reinforce the overall free-form structure. By analogizing with reinforced concrete, for example, the carbon nanotube fibers 8 are analogous to reinforcing materials such as steel whereas the matrix material 10 is analogous to that of aggregate or cement. In the continuing analogy, a composite nodal element 89 of the present invention is analogous to a building block formed of reinforced concrete material so that various building blocks are arranged relative to one another to ultimately define a structure.

Accordingly, constructing and arranging composite nodal elements to define a structure circumvents the common practice in the industry of post-fabrication processing operations.

Initially, a structure is often fabricated in a mold or by machining and then subjected to post-fabrication processing operations. Post-fabrication processing operations refer to added steps required beyond initial fabrication so that the structure exhibits desired dimensions and tolerancing. Typically, post-processing operations include for example, among others, machining, cleaning, polishing, grinding, deburring, and hole drilling so as to achieve desired dimensions and tolerancing of a fabricated structure.

On the other hand, free form structures in this description and appended claims refers to a structure fabricated in a single operational step that includes requisite dimensioning and tolerancing characteristics. Thus, free form structures are created without a mold or conventional machining techniques, such as for example with a lathe, milling machine so that the object is formed to predetermined dimensioning and tolerancing characteristics. Often, at a great savings of cost, time, labor, and the need for added equipment and maintenance thereof, free-form structures require minimal or no post-fabrication processing such as for example machining or polishing. It should be added that processes associated with fabricating free-form structures are referred to in this disclosure and appended claims as rapid manufacturing systems.

Referring to FIG. 1, the carbon nanotube fibers 8 are configured in one exemplary embodiment to exhibit a discrete length-to-diameter ratio. In one exemplary embodiment, the multiplicity of discrete carbon nanotube fibers 7 range in length between about 10 nanometers to about 500 microns. Accordingly, an optimal length-to-diameter provides for homogeneous dispersment of carbon nanotube fibers 8 throughout the matrix 9 as well as provides for the optimal length of carbon nanotube fibers or the formation of a composite nodal element via rapid fabrication techniques.

For the matrix 9, it should also be said that the matrix material 10 in one embodiment includes a metal, such as for example titanium. In one exemplary embodiment the matrix material 10 includes a metal alloy such as Ti-6Al-4V. In one exemplary embodiment, the matrix material 10 includes an intermetallic compound such as gamma TiAl. In one exemplary embodiment, the matrix material 10 includes a ceramic such as $Al_2O_3$. In one exemplary embodiment, the matrix material 10 includes a polymer such as polyvinyl chloride. Moreover, those of ordinary skill in the art will readily recognize any suitable matrix material for receiving carbon nanotubes for dispersment therein.

Figure 2:
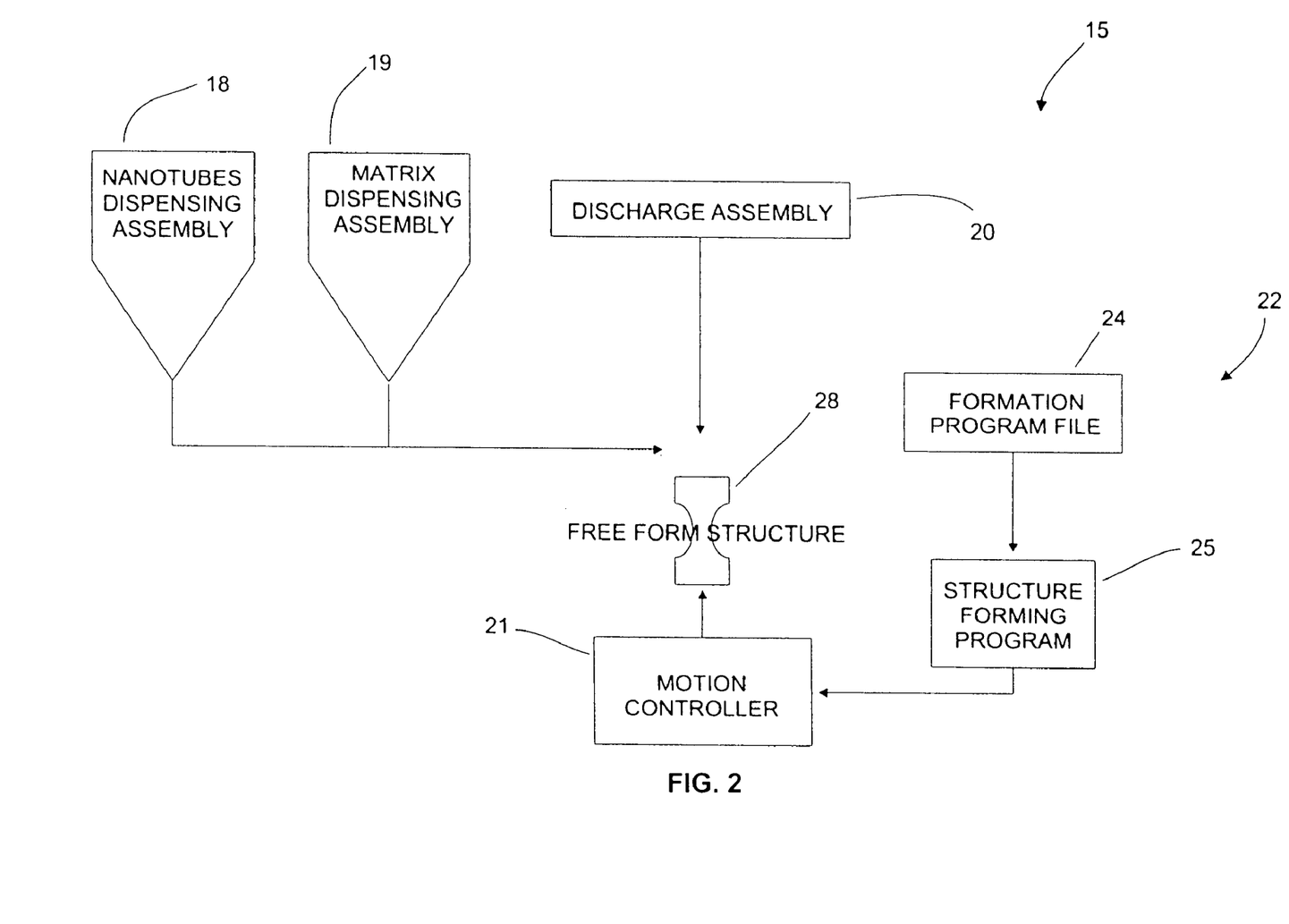
FIG. 2 is a schematic diagram illustrating a system according to the present invention for fabricating a free form structure by positioning one composite nodal element relative to another.

FIG. 2 schematically shows one exemplary embodiment of a system 15 for fabricating a free-form structure 28. In operation, the system 15 fabricates the structure 28 by arranging one composite nodal element with respect to another. In addition to arranging each nodal element, the system 15 initially forms each composite nodal element from a multiplicity of fibers formed of carbon nanotubes dispersed throughout a matrix.

Accordingly, for the embodiment of FIG. 2, the system 15 includes a nanotube dispensing assembly 18 and a matrix dispensing assembly 19. The system further includes a discharge assembly 20 for dispensing a fusing agent therefrom. Illustratively, in one exemplary embodiment, the discharge assembly 20 comprises a high-powered laser for emitting a fusing agent comprising a high-energy density laser beam emission therefrom. In another exemplary embodiment, the discharge assembly 20 comprises a particle beam device for emitting a fusing agent comprising a particle beam.

Through the application of a fusing agent by the system 15, a composite nodal element is formed by combining carbon nanotubes from the nanotube dispensing assembly 18 and matrix material from the matrix dispensing assembly 19. The system 15 repeats the process for creating a composite nodal element so as to ultimately form the structure 28, node-by-node.

To arrange each composite nodal element, the system 15 further includes an arranger for positioning one node relative to another to define the free-form structure 21. The arranger includes a positioning assembly 22 and a motion controller 21 operatively coupled to the positioning assembly 22. The positioning assembly 22 includes a formation program code 24. The formation program code 24 contains instructions in a computer readable format for the size dimensioning, tolerancing, and material composition of the ultimate free-form structure 28. In one embodiment, the formation program code 24 includes a Computer Aided Design (CAD) file associated with a free-form structure for providing instructions for arranging each composite nodal element according to a desired sizing dimensioning tolerancing and material composition characteristics, among others, required for fabricating that free form structure. In one exemplary embodiment, the positioning assembly 22 stores a template associated with the free-form structure 28 via the formation program code 24.

The positioning assembly 22 includes a structure formation program code 25 for arranging a plurality of elemental nodal elements with respect to instructions for generating the free-form structure 28. In one exemplary embodiment, the structure formation program code 25 arranges the plurality of elemental nodal elements along a plane or, commonly, a "slice" defining the desired free-form structure 28. The motion controller 21 operatively coupled with the positioning assembly 22 moves the free-form structure 28 during construction thereof for arranging each one of the nodes based on instructions received from the positioning assembly 22.

Figure 3:
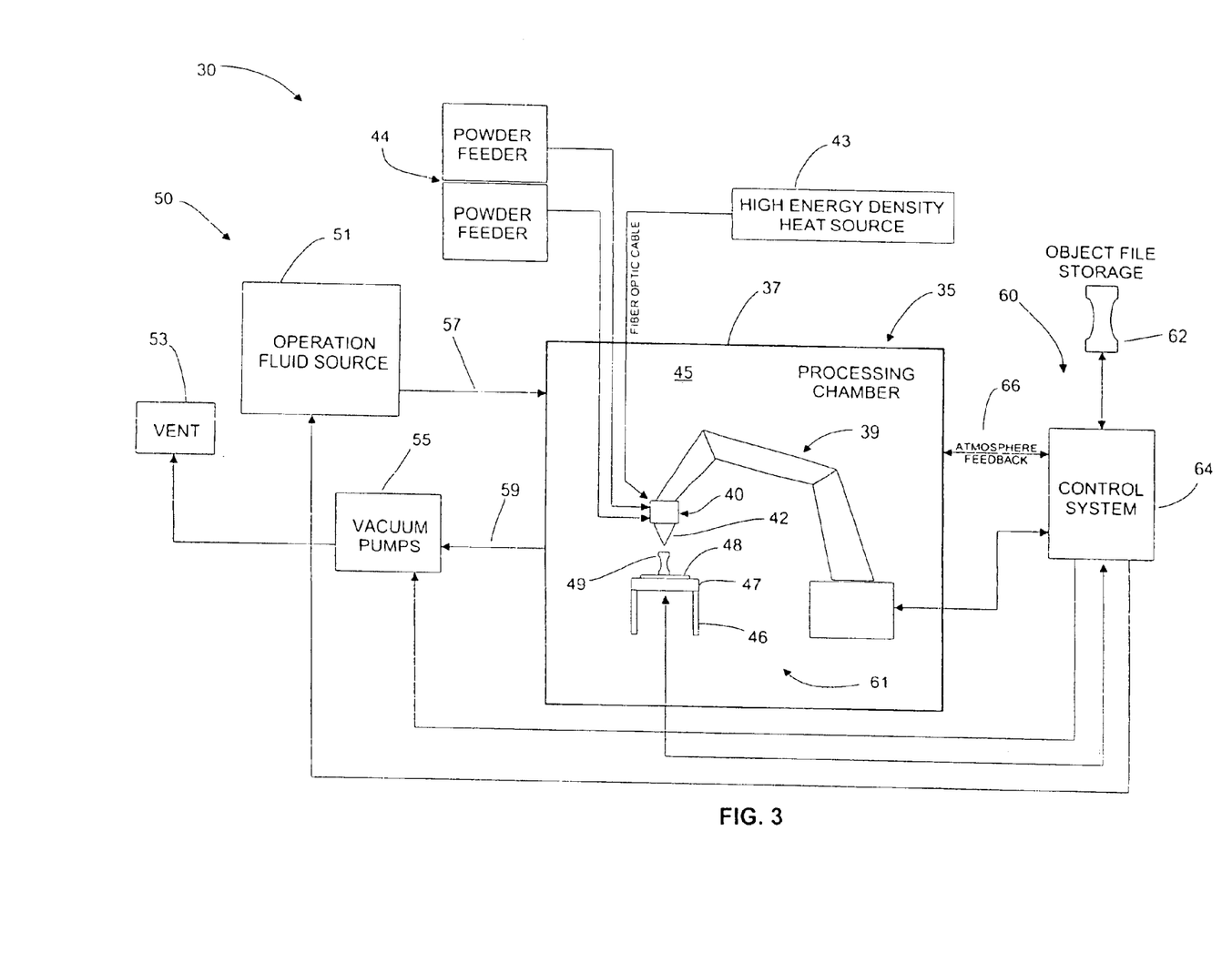
FIG. 3 is a schematic diagram illustrating another embodiment of a system for fabricating a free-form structure.

Referring to the embodiment of FIG. 3, a free-form structure 49 is fabricated via a system 30. In one exemplary embodiment, the discharge assembly 43 includes a high energy density heat source. The system 30 includes a discharge assembly 43 for dispensing a fusing agent. Illustrating, examples of a discharge assembly include, among others, an election beam device, a chemical vapor deposition system, a thermal spray device, a plasma deposition devise, and a molecular beam epitaxi system.

Illustratively, in one exemplary embodiment, the discharge assembly 43 includes a high-powered laser, such as for example a 700 watt neodymium yttrium-aluminum-garnet (Nd:YAG) laser. Accordingly, the high-powered laser emits a fusing agent comprising a high-energy density laser emission therefrom. In one exemplary embodiment, the fusing agent is transferred from the discharge assembly 43 toward the free-form structure 49 via fiber optic cable coupled with the high-powered laser 43 as shown in FIG. 3.

The system 30 further includes a composite formation device 35 operatively coupled with the discharge assembly 43. The composite formation device 35 includes a composite generator for engaging with the fusing agent so as to create a composite nodal element. A composite nodal element contains a matrix and a multiplicity of discrete fibers formed of carbon nanotubes dispersed throughout the matrix. For the exemplary embodiment of FIG. 3, the composite generator includes a generation coupling head 40 isolated from an external environment via a processing chamber 37. The processing chamber 37 encloses the generation coupling head 40 within a formation environment 45.

For one embodiment shown in FIG. 3, the generation coupling head 40 receives a fusing agent from the high-powered laser and material from a powder feeder dispenser 44. In particular, for one exemplary embodiment, the powder feeder dispenser 44 includes powdered matrix material and carbon nanotubes having a discrete length for optimally forming a composite nodal element. As such, the matrix material and carbon nanotubes combine with the fusing agent through a composite nodal element formation sequence implemented by the generation coupling head 40. Those of ordinary skill in the art will readily recognize any combination of carbon nanotubes including single walled and/or multiple walled carbon nanotubes.

In one exemplary embodiment, the generation coupling head 40 controllably disperses discrete fibers, including carbon nanotubes, throughout the matrix. In one exemplary embodiment, the generation coupling head 40 homogeneously disperses discrete fibers, including carbon nanotubes, throughout the matrix. In one exemplary embodiment, the generation coupling head 40 variably disperses discrete fibers, including carbon nanotubes, throughout the matrix.

In one exemplary embodiment, the multiplicity of fibers may comprise reinforcement fibers for engagement with the matrix. In one exemplary embodiment, the multiplicity of discrete fibers range in length of between about 10 nanometers to about 500 microns. In one exemplary embodiment, the matrix includes a metal. In one exemplary embodiment, the matrix includes a metal alloy. In one exemplary embodiment, the matrix includes an intermetallic compound. In one exemplary embodiment, the matrix includes a ceramic. In one exemplary embodiment, the matrix includes a polymer.

To ensure that the formation environment 45 facilitates optimal creation of a free-form structure, the system 30 in one exemplary embodiment includes an environmental control system 50 in operative engagement with the interior of the processing chamber 37. Those of ordinary skill in the art will readily recognize that the system 30 in at least one exemplary embodiment does not receive an environmental control system 50 and/or a process chamber 37 for the optimal creation of a free-form structure.

In particular, as shown in FIG. 3, the environmental control system 50 includes an environmental operating fluid source 51 for supplying an operating fluid to the interior of the processing chamber 37 so as to define the atmosphere included by the formation environment 45. Accordingly, the operating fluid is transferred from the source 51 to the formation environment 45 via an inlet 57 in communication with the interior of the processing chamber 37. In one exemplary embodiment, the operating fluid includes, among others, an inert gas, such as argon or nitrogen for introduction into the processing chamber 37.

The environmental control system 50 includes a series of pumps 55 for extracting waste fluid from the formation environment 45. The term waste fluid refers to unwanted fluids resulting from the fabrication of the free-form structure 49. An outlet 59, in communication with the interior of the processing chamber 37, removes waste fluid from the formation environment 45 as driven by the vacuum pump array 55. As shown in FIG. 3, the waste fluid is then exhausted from the system 30 via a vent assembly 53 in operative engagement with the outlet 59. Moreover, in one exemplary embodiment, a feedback control system 66 coupled to the formation environment 45 is provided by the environmental control system 50 to maintain an optimal formation environment 45 within the processing chamber 37.

The composite formation device 35 further includes an arranger in operative engagement with the composite generator. In one exemplary embodiment, as the composite generator engages with the fusing agent to create a composite nodal element, the arranger positions the forming composite nodal element relative to another to thus define the free form structure 49.

The arranger includes a positioning assembly 60 and a motion controller 61 in operative engagement with the positioning assembly 60. The positioning assembly 60 includes a control system 64. The control system 64 implements program sequences for arranging one node relative to another. The control system 64 further includes program sequences for engaging a fusing agent with a matrix and a multiplicity of carbon nanotube fibers so as to create a composite nodal element.

Specifically, in one exemplary embodiment, a program sequence implemented by the control system 64 includes a composite formation code. The composite formation code generates a composite node, via the composite generator, by combining a matrix with a multiplicity of fibers formed of carbon nanotubes. Moreover the composite formation code may include a code for homogeneously combining the multiplicity of fibers with the matrix.

The control system 64 further includes a structure formation program code for arranging one composite node relative to another via the arranger to define a free-form structure. Moreover, in one exemplary embodiment, the structure formation program code may include a code for arranging one composite node relative to another based on a template.

Shown in FIG. 3, the positioning assembly 60 further includes an object file storage 62 coupled with the control system 64. Operatively, the object file storage 62 stores a template associated with the free-form structure 49. Moreover, the object file storage 62 contains information associated with the free-form structure 49 based on a computer-readable code. By accessing information stored in the object file storage 62, the control system 64 moves each one of the nodes according to instructions based on a computer-readable code and/or based on a template.

With instructions from the control system 64, the motion controller 61 moves each one of the nodes so as to ultimately generate the free-form structure 49. The motion controller 61 includes a worktable 46 having a movable base platform 47. In one exemplary embodiment, the control system 64 is operatively coupled with the moveable base platform 47 so as to facilitate arrangement of one node relative to another.

In one exemplary embodiment, the control system 64 is coupled with a motion apparatus 39 provided by the motion controller 61 for positioning the generation coupling head 40 about the processing chamber 37 so as to ultimately facilitate fabrication of the free-form structure 49. The motion apparatus 39 in one exemplary embodiment comprises a robot coupled to the generation coupling head 40.

In operation, the control system 64 instructs the motion apparatus 39 to place the generation coupling head 40 relative to the worktable 46. The control system 64 then establishes optimal conditions characteristic of the formation environment 45 for the fabrication of the free-form structure 49. For one embodiment shown in FIG. 3, the generation coupling head 40 combines a fusing agent from the high-powered laser with a matrix and a multiplicity of carbon nanotubes each provided by the powder feeder dispenser 44.

Figure 4:
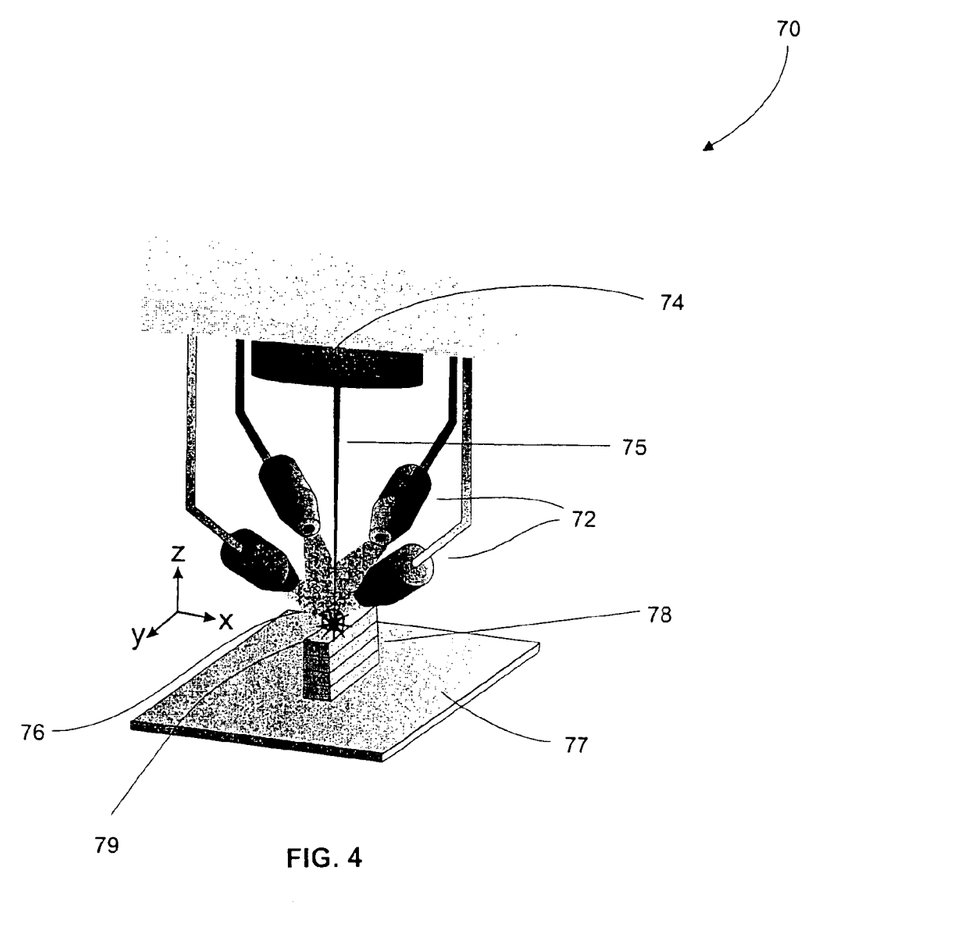
FIG. 4 is a perspective view illustrating the system of FIG. 3 featuring the generation of a free-from structure through the deposition of one composite nodal element relative to another.

In particular, the generation coupling head combines the fusing agent, the matrix, and the multiplicity of carbon nanotubes in a single stream 42. Accordingly, FIG. 4 shows a perspective view of a system 70 for fabricating of a free form structure 78 from a single stream. The system 70 includes a discharge assembly 74 for dispensing a fusing agent 75. In one exemplary embodiment, the fusing agent 75 comprises a laser beam emission. The system 70 further includes a deposit formation device including a composite generator 72.

In FIG. 4, the composite generator 72 engages a matrix and carbon nanotube fibers, collectively shown as stream 76, with the fusing agent 75 so as to create a composite nodal element 79.

As such, in one exemplary embodiment, the composite formation device includes an arranger. The arranger includes a motion apparatus and/or a moveable base platform for positioning one node relative to another to define the free-form structure 78 of FIG. 4. Initially, as discussed in greater detail below, a substrate material is ejected from the composite generator 72 for engagement with the fusing agent 75. Accordingly, a substrate 77, and 48 in FIG. 3, is cooled and formed atop a worktable. In effect, the substrate acts as a foundation by which each subsequent composite nodal element is deposited on so as to ultimately fabricate the free-form structure 78. Typically, once a free-form structure is completed, the substrate 77 and transition material between the substrate and the desired free form structure is removed from the resulting free form structure prior to use thereof.

Figure 5:
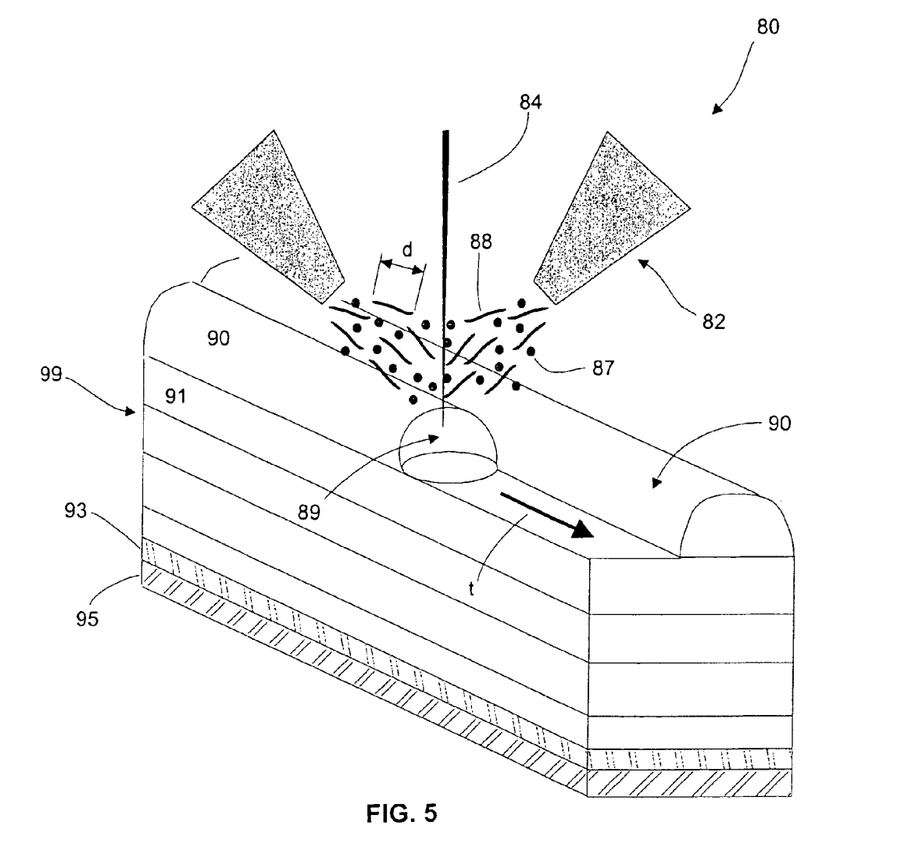
FIG. 5 is an isometric view illustrating the formation of a composite nodal element containing a multiplicity of discrete fibers formed of carbon nanotubes dispersed throughout a matrix such that a free-form structure is defined by positioning the composite nodal element relative to another.

FIG. 5 refers to a detailed isometric view of a system 80 for fabricating a free-form structure 99. In particular, a composite nodal element 89 is formed by engaging a fusing agent 84 with a matrix 87 and a multiplicity of discrete fibers 88 formed of carbon nanotubes. In one exemplary embodiment, the composite nodal element is characterized as an amorphous or molten weld pool heated by the energy from a laser defining the fusing agent.

The composite nodal element cools and solidifies so as to ultimately define the free-form structure. In one exemplary embodiment, the free-form structure 99 is defined by one layer of composite nodal elements 90 deposited on another 91.

Each successive layer is configured by the system 80 based on information and/or a template provided by a control system. During the formation of a layer 90, a series of composite nodal elements are generated adjacent to one another along the travel direction of the fusing agent, as shown in FIG. 5 as reference arrow "t". In one exemplary embodiment, to ensure material and structural continuity, the fusing agent provides energy so as to partially melt composite nodal elements adjacent to the composite nodal element being formed thereby integrating the newly formed composite nodal element with the other composite nodal elements.

Referring to the operation of system 80, a layer of substrate material 95 is initially deposited as a foundation by which the free-form structure 99 is subsequently deposited thereon. Typically, the amorphous or viscous material state of the newly formed substrate material results in the creation of a transitional layer 93. During formation of the transitional layer 93, stray amorphous substrate material combines, via the system 90, with the desired composite material defining the free-form structure 99. Ultimately, after completion of fabrication of the free-form structure 99 the transition layer 93 and substrate layer 95 are removed from the free-form structure 99.

As shown in FIG. 5, the deposition of each successive composite nodal element layer, such as for example layers 90, 91, is associated with the movement of a composite formation device 82 while receiving a fusing agent 84 along a travel direction, "t". As shown in FIGS. 4 and 5, in one exemplary embodiment, the matrix material 87, in a powdered form, is mixed with discrete carbon nanotube fibers 88 to form a single stream. As the stream receives energy from the fusing agent 84, a composite nodal element 89 is created. For one embodiment of FIG. 5, the fibers of carbon nanotubes are of a predetermined length "d", as indicated in FIG. 5, for the optimal formation of a composite nodal element. In one exemplary embodiment, the multiplicity of discrete fibers range in length of between about 10 nanometers to about 500 microns.

Figure 6:
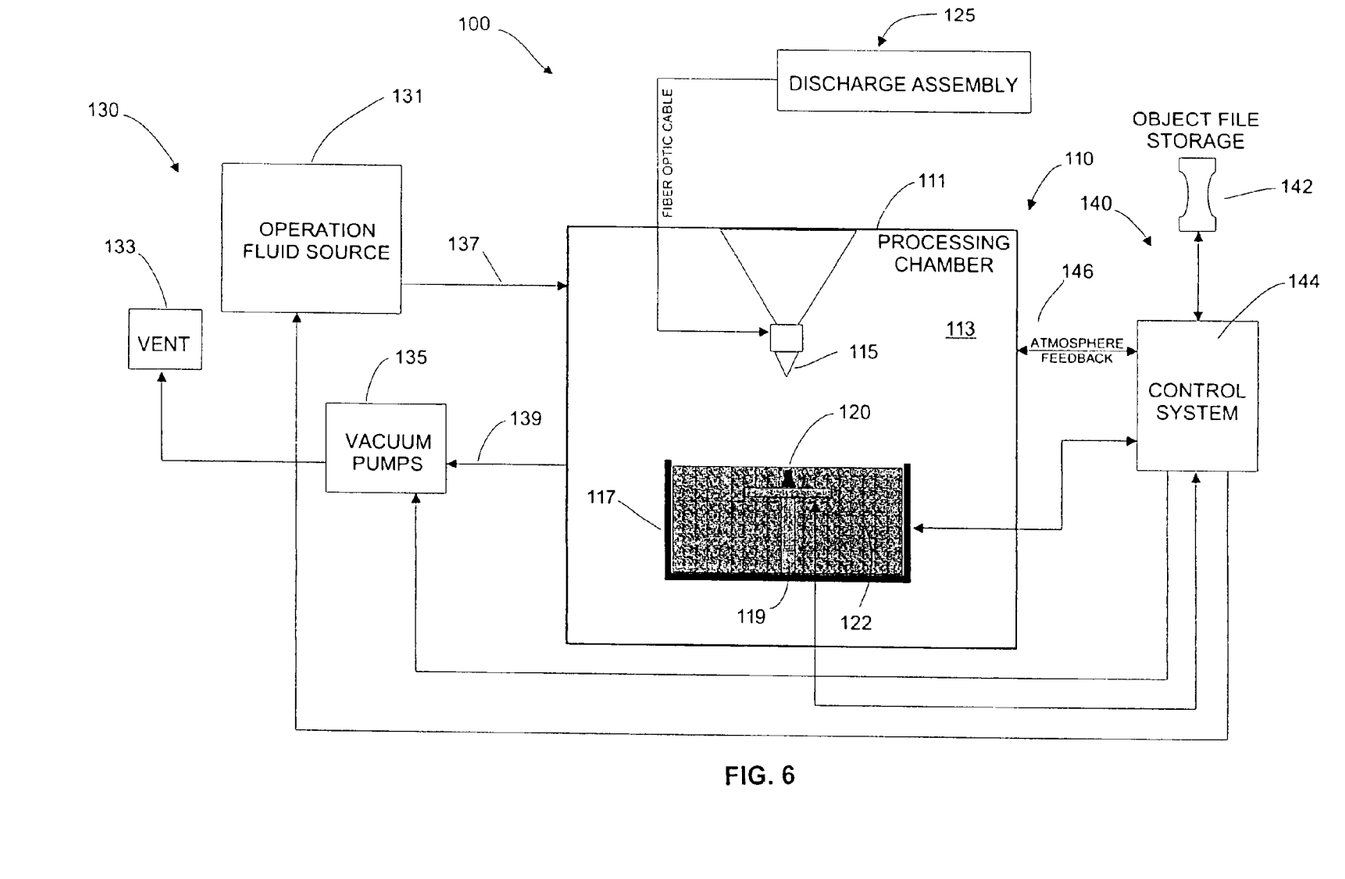
FIG. 6 is a schematic diagram illustrating another embodiment of a system for fabricating a free-form structure.

For the exemplary embodiment of FIG. 6, a free-form structure 120 is fabricated by a system 100. Although including similar aspects as that of the system 30 of FIG. 3, the system 100 of FIG. 6 provides a different rapid manufacturing process for fabricating a free-form structure. Generally, system 100 differs in that matrix and carbon nanotube materials are combined with a fusing agent in a different manner than that of the system 30 of FIG. 3.

As distinguished from the generation coupling head 40 and movement applied thereto, in part, by the motion apparatus 39 of FIG. 3, the system 100 of FIG. 6 includes a raw material container 117 containing a powder bed 122. The powder bed 122 includes a matrix powder and a multiplicity of fibers formed of carbon nanotubes dispersed throughout the matrix powder. Operatively, a discharge assembly 125, such as a high-powered laser for example, dispenses a fusing agent from a focus head 115 so as to subject discrete portions of the powder bed 122 to a fusing agent, such as a laser beam. Accordingly, the free-form structure 120 is created from fused sections within the powder bed 122. It should also be added that a worktable 119 may be provided to position the free-form structure 120 during fabrication.

However, similar to the system 130 of FIG. 3, the system 100 of FIG. 6 includes an environmental control system 130 including an operator fluid source 131, a vent assembly 133, a pump system 135, and a feedback 146. In addition, the system 100 includes a control system 144 and an object file storage 142 coupled to the control system 144, both of which are included by the positioning array 140. In one exemplary embodiment, the discharge assembly 125 includes a high energy density source. In one exemplary embodiment, the discharge assembly 125 includes a high-powered laser. Moreover, the system 100 includes a processing chamber 111 for enclosing a formation environment 113.

Figure 7:
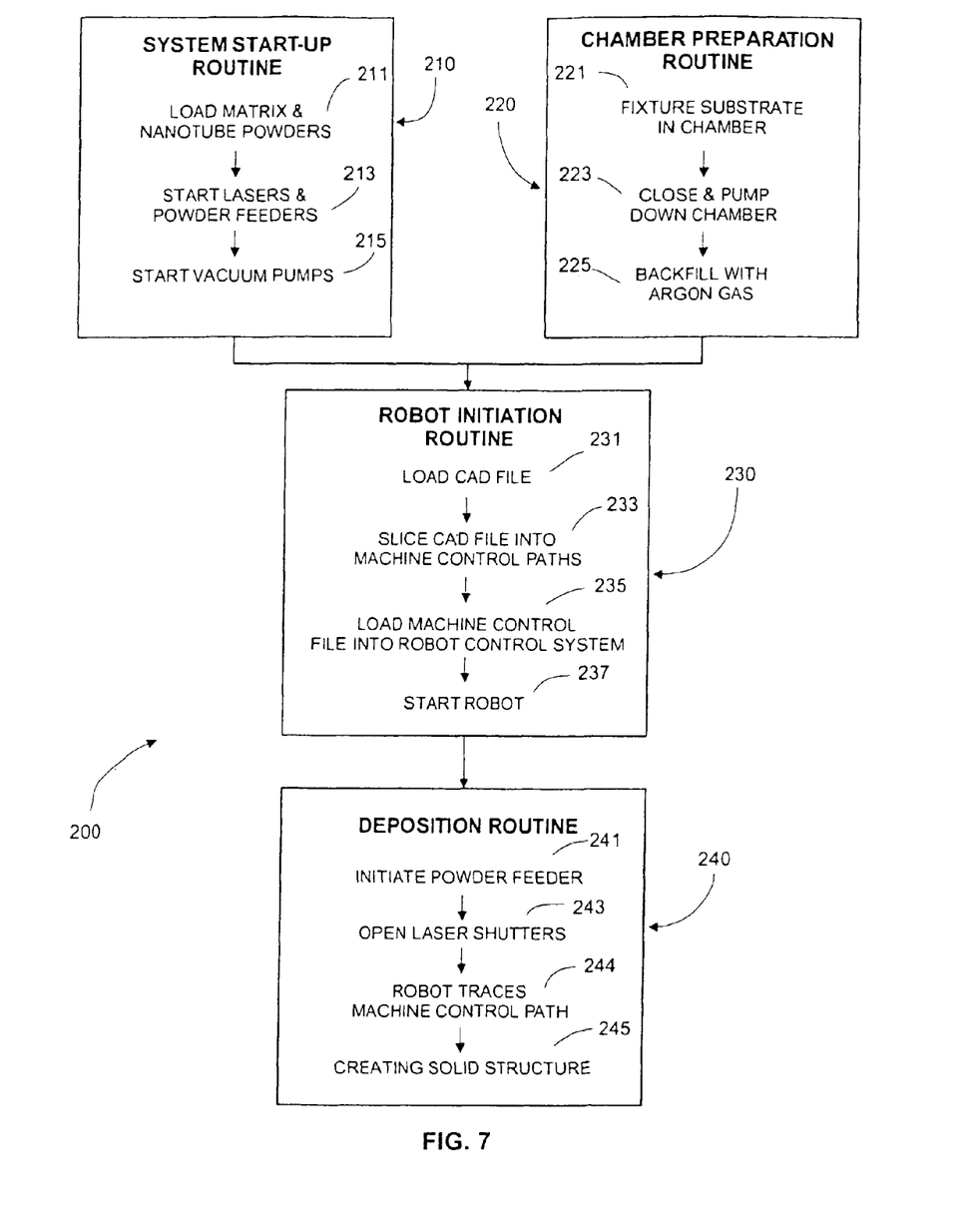
FIG. 7 is a flow diagram illustrating a free-form fabrication sequence implemented by a system of the present invention.

FIG. 7 refers to the free-form fabrication sequence 200 executed by the system 30 of FIG. 3. The free-form fabrication sequence 200 illustrates one exemplary embodiment for fabricating a free-form structure defined by an array of composite nodal elements that include a multiplicity of carbon nanotubes dispersed throughout a matrix. In one exemplary embodiment, the multiplying of carbon nanotubes are controllably dispersed throughout a matrix. In one exemplary embodiment, the multiplying of carbon nanotubes are homogeneously dispersed throughout a matrix. Those of ordinary skill in the art will readily recognize other free-form fabrication sequences so long as a resulting free-form structure includes composite material based on carbon nanotubes dispersed throughout a matrix.

Referring to FIG. 7, the free-form fabrication sequence 200 includes a system start-up routine 210, a chamber preparation routine 220, a robot initiation routine 230, and a deposition routine 240. The system start-up routine 210 includes supplying the system 30 with matrix and nanotube raw materials as per step 211. In step 213, the high-powered laser 43 and the generation coupling head 40 of FIG. 3 are activated. In step 215, the vacuum pump array 55 of the environmental control system 50 is activated.

The chamber preparation routine 220 in step 221 includes optimally positioning the motion controller 61 for processing operations. In step 223, a vacuum is established within the processing chamber 37. In step 225, an operating fluid is applied to the formation environment 45.

The robot initiation routine 230 of FIG. 7 may include accessing the object file storage 62 and retrieving an object file therefrom. The object file includes, among others, information associated with size, dimensioning, tolerancing, and material composition of the desired free-form structure. In step 233, through instructions in a machine-readable code, the desired object is partitioned so as to correspond with the control paths executed by the arranger. In step 235, the control system 64 sends the partitioned object file to the generation coupling head 40 and to the motion controller 61, including the motion apparatus 39, and the moveable base platform 47. Based on the information received from the control system 64, the motion controller 61 is activated in step 237.

The deposition routine 240 includes initiating the powder feeder dispenser 44 in step in step 241 and engaging dispensing of a fusing agent in step 243. Based on information received by the control system 64, the motion controller 61, including the motion apparatus 39, traces the control path for the deposition and arrangement of composite nodal elements in step 244. In step 245, the deposition continues so as to create a solid part or free-form structure.

Figure 8:
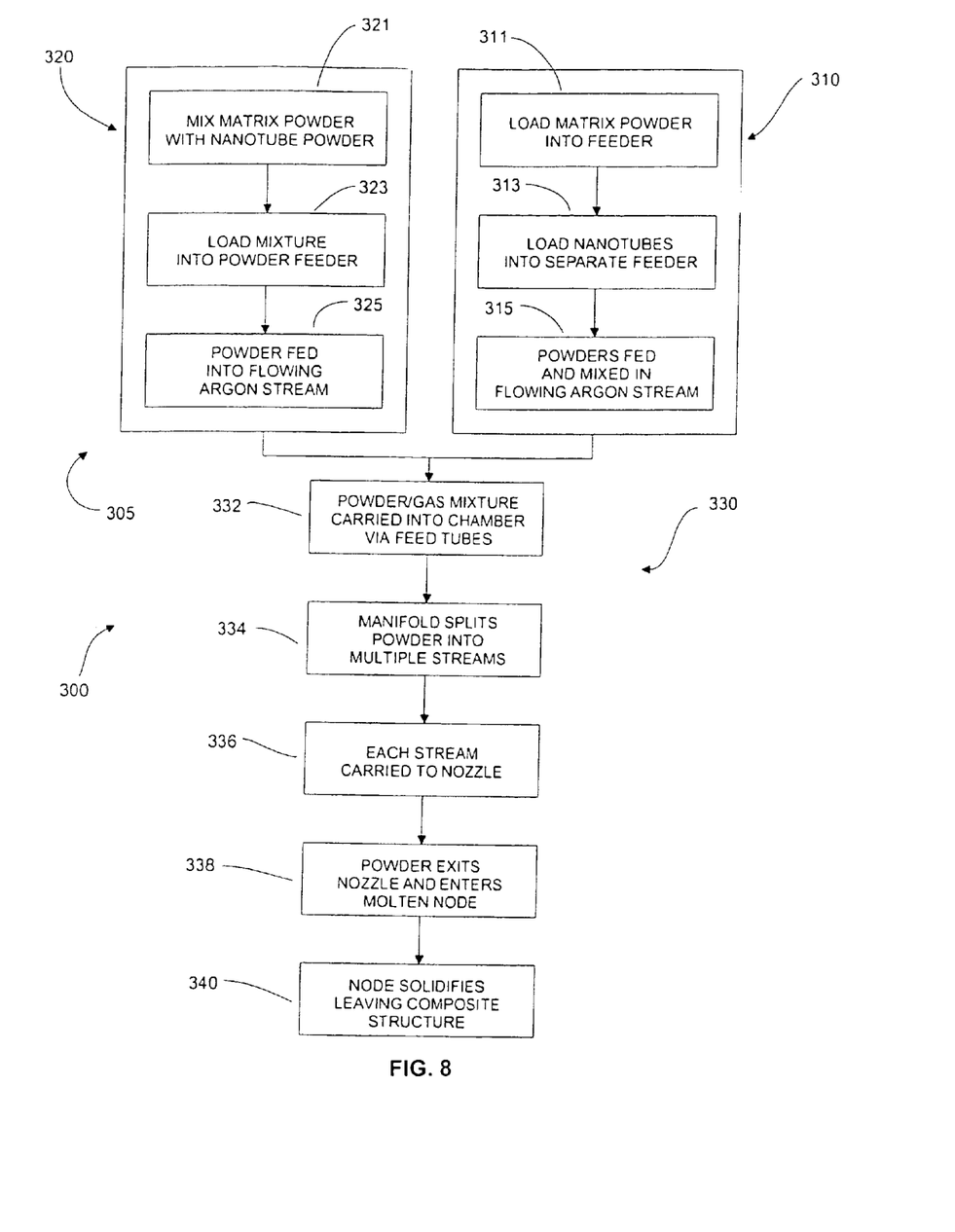
FIG. 8 is a flow diagram illustrating a composite nodal element formation sequence implemented by a system of the present invention.

Referring to FIG. 8, the composite nodal element formation sequence 300 generally includes an initialization routine 305 and a formation routine 330 operatively linked with the initialization routine 305. Depending on the type of rapid manufacturing technique and/or system used, the initialization routines 305 vary. Although those of ordinary skill in the art will readily recognize other suitable initialization routines based on the type of rapid fabrication processes and/or systems used to create composite structures that include carbon nanotubes, FIG. 8 shows two initialization routines. Specifically, in one exemplary embodiment, FIG. 8 includes an initialization routine 310 for system 30 of FIG. 3. FIG. 8, in one exemplary embodiment, further includes an initialization routine 320 for system 100 of FIG. 6.

Referring to the initialization routine 310, matrix material in powder form is loaded into one dispenser system of the powder feeder 44 of FIG. 3. Similarly, the carbon nanotube fibers are loaded into another dispenser system of the powder feeder 44, apart from the dispenser system in step 311. As such, in step 315, powders are fed into a stream of operating fluid, such as an inert gas. Moreover, in step 315, the matrix material and carbon nanotube material are combined and mixed in the flowing stream of operating fluid.

Alternatively, for the initialization routine 320 matrix material is mixed with carbon nanotubes in step 321 prior to being fed into an operating fluid stream. In other words, whereas the initialization routine 310 provides for an in situ combination of matrix material and carbon nanotubes prior to introduction into an operating fluid stream, the initialization routine 320 provides for an ex situ combination of matrix material and carbon nanotubes prior to introduction with an operating fluid stream. Accordingly, the mixture of matrix material and carbon nanotubes from step 321 are loaded into a powder feeder dispenser 44 in step 323. In step 325, the mixture of matrix material and carbon nanotubes is fed into a flowing stream of operating fluid.

For the formation routine 330, once a powder-gas mixture is established via the initialization routine 305, the powder-gas mixture is carried into the processing chamber 37 through feed-tubes. In step 334, for the system 30 of FIG. 3, the generation coupling head 40 splits the powder-gas mixture into a plurality of streams. In step 336 each stream is carried to a nozzle provided by the generation coupling head 40.

As illustrated in FIG. 4, each stream of powder-gas mixture exits a respective nozzle and, for a location determined by the control system 64, combines with a fusing agent such as a laser beam emission. The combination of exiting powder combined with the fusing agent in step 338 results in the formation of a molten composite nodal element. Accordingly, in step 340 the resulting composite nodal element solidifies so as to define a free-form structure, as illustrated for example in FIG. 5.

Although the present invention has been described in detail, it should be understood that various changes, substitutions, and alterations can be made hereto without departing from the spirit and scope of the invention as defined by the appended claims that follow.

What is claimed is:

1. A free form composite structure comprising:
   a plurality of discrete nodal elements, each of the nodal elements comprising:
      a matrix; and
      a multiplicity of reinforcement elements formed of carbon nanotubes;
   wherein the multiplicity of reinforcement elements are dispersed throughout the matrix; and
   wherein the plurality of nodal elements are arranged and fused with respect to one another to form the free form composite structure.

2. The free form structure according to claim 1 wherein the multiplicity of reinforcement elements are homogeneously dispersed throughout the matrix.

3. The free form structure according to claim 1 wherein the reinforcement elements range in length of between about 10 nanometers and 500 microns.

4. The free form composite structure of claim 1, wherein the matrix comprises an array of nodal elements.

5. The free form composite structure of claim 1, wherein the matrix comprises a metal.

6. The free form composite structure of claim 1, wherein the matrix material(s) and carbon nanotubes are controllably dispersed within each nodal element.

7. The free form composite structure of claim 1, wherein at least one nodal element has a varying distribution of reinforcement elements.

8. The free form composite structure of claim 1, wherein free form structure includes at least one nodal element having a varied composition of reinforcement elements relative to the composition of reinforcement elements of the adjacent nodal elements.

9. The free form composite structure of claim 1, wherein the matrix comprises a metal alloy.

10. The free form composite structure of claim 1, wherein the matrix comprises an intermetallic compound.

11. The free form composite structure of claim 1, wherein the matrix comprises a ceramic.

12. The free form composite structure of claim 1, wherein the matrix comprises a polymer.

13. A free-form composite structure, comprising:
   a plurality of layers overlying one another;
   wherein each layer comprises at least one discrete nodal element, said nodal element being fused to an adjacent nodal element;
   wherein each nodal element comprises a matrix and a plurality of carbon nanotubes.

14. The free-form composite structure of claim 13 wherein each layer comprises a plurality of nodal elements, wherein each nodal element is fused to an adjacent nodal element.

15. The free-form structure according to claim 13 wherein the plurality of carbon nanotubes are homogeneously distributed throughout the matrix.

16. The free-form structure according to claim 13 wherein the matrix comprises a metal or metal alloy.

17. The free-form structure according to claim 13 wherein carbon nanotubes are controllably dispersed in each nodal element.

18. A free-form composite structure, comprising:
a plurality of layers overlying one another;
wherein each layer comprises a plurality of discrete nodal elements, each of the nodal elements comprising:
a matrix that includes a metal; and
a multiplicity of carbon nanotubes homogeneously dispersed throughout the matrix;
wherein the plurality of nodal elements are fused with respect to adjacent nodal elements to form the free-form composite structure.

* * * * *